United States Patent [19]

Heidenreich

[11] 4,401,426
[45] Aug. 30, 1983

[54] TORQUE LIMITING CLUTCH

[75] Inventor: David C. Heidenreich, Middleburg Heights, Ohio

[73] Assignee: Power Transmssion Technology, Inc., Copley, Ohio

[21] Appl. No.: 238,878

[22] Filed: Mar. 6, 1981

[51] Int. Cl.³ .............................................. F16D 7/02
[52] U.S. Cl. ........................................ 464/41; 464/48
[58] Field of Search ........................ 464/37, 38, 41, 48

[56] References Cited

U.S. PATENT DOCUMENTS

| 2,380,572 | 7/1945 | Barron | 192/70.26 |
| 2,540,997 | 2/1951 | Schmitter | 464/48 X |
| 2,939,301 | 6/1960 | Huddle | 464/48 |
| 2,940,283 | 6/1960 | Christenson et al. | 464/48 |
| 2,959,945 | 11/1960 | Hugo et al. | 464/38 |
| 3,122,903 | 3/1964 | Ramsden | 464/48 |
| 3,345,833 | 10/1967 | Burrows | 464/48 |
| 3,546,897 | 12/1970 | Kenny | 464/38 |
| 3,600,877 | 8/1971 | McCrary | 464/48 X |
| 3,664,472 | 5/1972 | Martini et al. | 464/48 X |
| 4,171,147 | 10/1979 | Swisher, Jr. et al. | 464/48 X |

Primary Examiner—Stuart S. Levy
Assistant Examiner—Daniel P. Stodola
Attorney, Agent, or Firm—Oldham, Oldham, Hudak, Weber & Sand Co.

[57] ABSTRACT

A torque limiting clutch having at least two friction surfaces placed under pressure by pre-compressed helical springs employed for eliminating adjustment and compensating for wear of said clutch during use.

12 Claims, 3 Drawing Figures

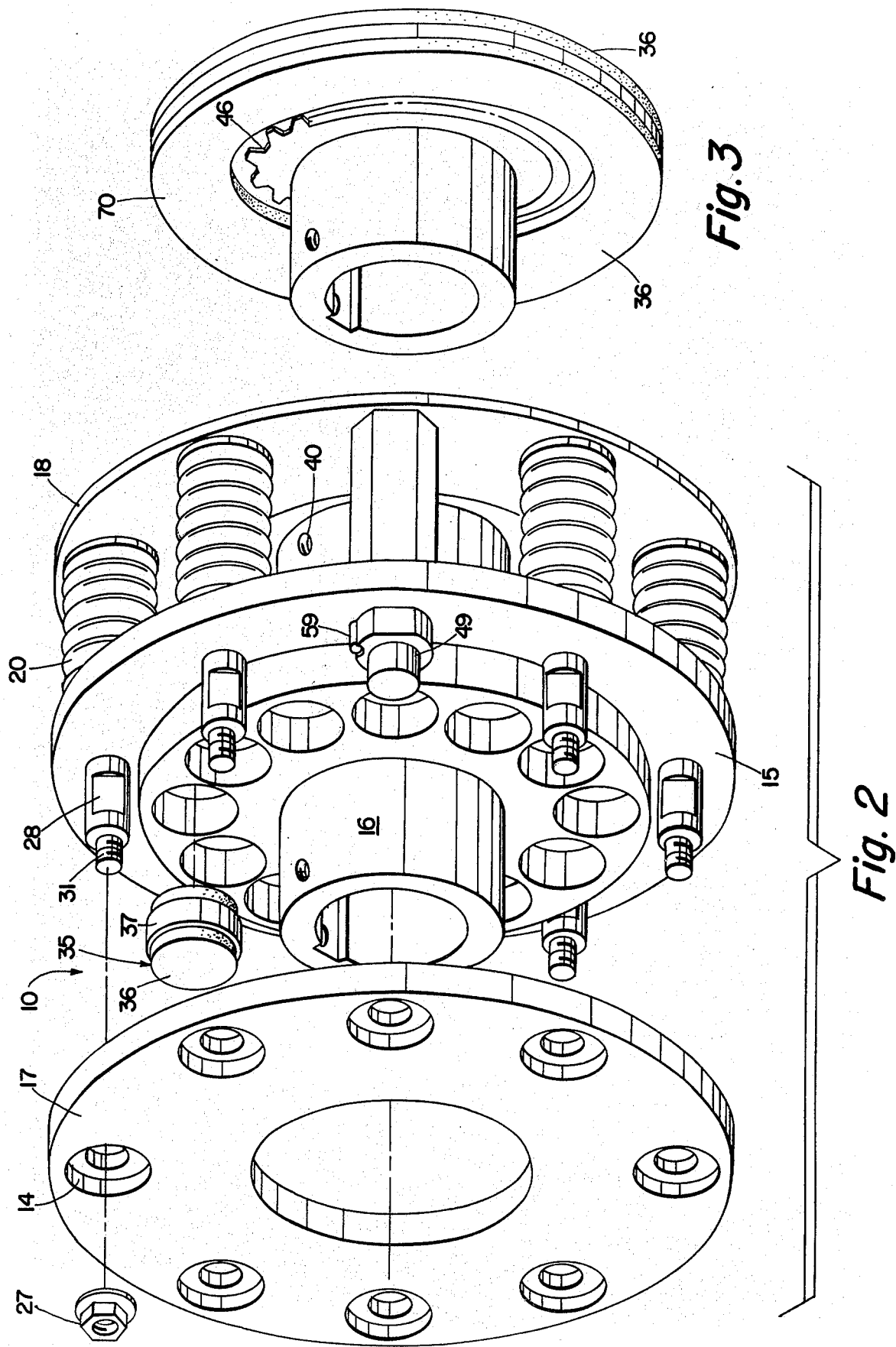

TORQUE LIMITING CLUTCH

BACKGROUND OF THE INVENTION

This invention relates to torque limiting clutches adapted for general application with power transmission machinery and particularly to torque limiting clutches having axial pressure engagement of the friction surface by helical springs such that no adjustment is required at installation or as the friction surface wears down.

It is common practice in the machinery drive art to provide spring loaded, friction type torque limiting clutches in the drive train to prevent damage from extremely high shock loads or machinery jams. In operation, machinery such as mining machinery, transmit a shock load through the drive to a clutch that slips and thus limits the shock load within the drive machinery. Though prior art torque limiting clutches have gained commercial acceptance, they exhibit certain drawbacks. The proper torque setting is dependent upon the skill of the assembler in adjusting the spring load on the friction surface. Also, after a period of functioning to relieve overload shock, the friction surfaces would wear and thus a readjustment of the load springs would be required to compensate for the wear and maintain the necessary pressure on the friction surfaces to properly operate the drive. If wear proceeds without adjustment, clutch torque is apt to diminish to the point that common friction type torque limiters will slip and the friction surfaces will burn damaging the clutch and losing the ability to function. Further, when the prior art torque limiting clutches are readjusted for wear, they are often overadjusted too tightly and thus the shock load protection capability is lost which results in severe damage to the drive machinery.

This invention is directed to a novel torque limiting clutch that overcomes the problems previously experienced.

SUMMARY OF THE INVENTION

The present invention provides a torque limiting clutch having at least two friction surfaces engaging an input hub and pressure plate and placed under pressure by pre-compressed helical springs.

It is an object of the present invention to provide an improved torque limiting clutch that requires no adjustment for friction surface wear.

It is another object of the present invention to provide an improved torque limiting clutch that requires no adjustment upon assembly and installation.

It is yet another object of this invention to provide an improved torque limiting clutch of the single or multiple disc type that requires no adjustment upon assembly and installation nor during its wear life.

BRIEF DESCRIPTION OF THE DRAWINGS

The invention will be more fully understood from the following detailed description thereof when considered in connection with the accompanying drawing wherein the invention is illustrated by way of example and in which:

FIG. 2 is a perspective view of the invention;

FIG. 3 is a perspective view of a disc type frictional surfaces employed in a second embodiment of the invention.

DETAILED DESCRIPTION

Figure 1:
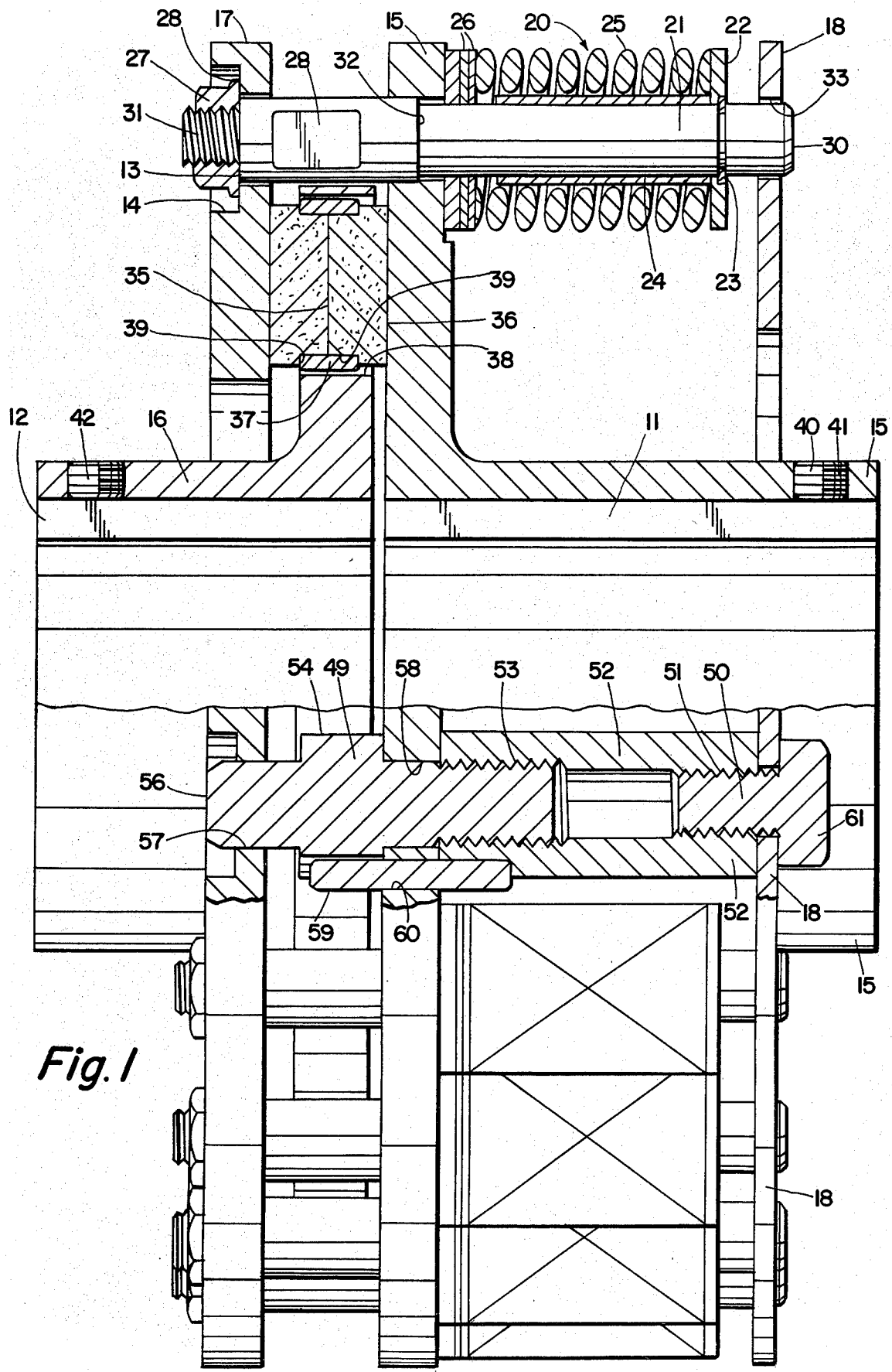
FIG. 1 is a longitudinal cross-sectional view in part of a torque limiting clutch according to this invention.

Referring to the drawing and more particularly to FIGS. 1 and 2, reference numeral 10 generally designates the torque limiting clutch according to one embodiment of this invention. Input hub 15 is suitably keyed 11 to an input drive shaft for transmitting rotary motion to the output hub 16 which is also suitably keyed 12 to an output drive shaft. Input key 11 is held in place by means of a set screw turned into a threaded hole 40 in the input hub 15 and output hub 16 is similarly arranged for a set screw to be inserted into threaded hole 42. Instead of keying, it is understood the input hub 15 and output hub 16 can be connected directly to an input and output shaft by splines or other methods well known in the art. The clutch is preferably made of cast iron but other metals having suitable strength may be used.

Output hub 16 has holes drilled in the disc portion at 38 spaced symmetrically around the disc portion at the same radius for receiving friction pucks 35. The friction pucks are recessed 39 around the outer periphery for receiving ring shaped bushing 37. The friction pucks 35 are made of typical clutch wear resistant material well known in the art while bushings 37 are typically made of a tough high temperature plastic bearing material such as reinforced Teflon.

The bushings 37 fit within holes 38 with a slight clearance to permit compensating for axial, angular or radial misalignment between input and output shafts. This is the important advantage in using friction pucks 35 for connecting the input drive to the output drive. However, it can be understood that a singular friction disc 70 as shown in FIG. 3 can be employed or multiple discs may be used as further embodiments of the invention.

Friction pucks 35 have friction surfaces 36 which are engaged with surfaces on pressure plate 17 and input hub 15. Pressure plate 17 is urged into engagement with friction surface 36 by spring 25 of spring bolt assembly 20. Spring bolt assembly 20 includes a bolt 21 around around which is positioned a helical spring 25 between thrust washers 22. Retaining ring 23 holds one thrust washer 22 in place on the bolt 21 and permits spring 25 to be compressed against it.

An insulator bushing 24 made of preferably a Phenolic plastic composition is positioned on bolt 21 within spring 25 to protect against excessive heat transfer from bolt 21 to spring 25 which would damage the resiliency of spring 25. Bolt 21 passes through input hub 15 and pressure plate 17 to a threaded 31 end. The threaded 31 end applies spring 25 force to the ring shaped pressure plate 17 by the flange 28 of lock nut 27. The lock nut 27 is seated 13 at the bottom of the threaded 31 of the bolt 21. Locknut 27 is tightened by turning a socket wrench while holding the bolt 21 from turning by applying an open end wrench to machined flats at 29 on the bolt 21. The spring bolt assembly 20 alignment is maintained by inserting the bolt 21 through a hole 33 in retainer disc 18. Since each spring 25 will have variable characteristics due to manufacturing tolerances insulator shims 26 are used in the amounts required accordingly to attain uniform force on each assembly 20. By using insulating material such as compressed asbestos shims, the spring 25 is further protected from heat generated by the friction surface 36 when in operation. Bolt 21 is machined in two different diameters to form a stop shoulder as shown at 32. Thus, as friction surfaces 36 wear, precompressed spring 25 will expand against thrust washer 22 along bolt 21 until reaching stop shoulder 32. This will automatically limit the wear of friction surfaces 36 and when excessive slipping and loss of drive power is noted, it will serve as an indicator to replace the friction pucks 35. The automatic limiting by shoulder stop 32 prevents damage to the torque limiter. A torque pin 49 is threaded 53 into a hexagonal spacer nut 52 that extends between input hub 15 and retainer disc 18. Bolt 50 is tightened into threads 51 of spacer nut 52 against the seat of bolt head 61 and retainer disc 18. Torque pin 49 extends through openings 58 in input hub 15, and 57 in pressure plate 17. In the preferred embodiment, two torque pins 49 are employed to hold retainer disc 18 in place and to transmit one half of the drive power from input to pressure plate 17. As illustrated in FIG. 1, torque pins 49 hold retainer disc 18 in place in combination with spacer nut 52 and bolt 50. Torque pin end 56 extends through pressure plate 17 as shown at 57 to input rotary drive power through the friction surface 36 to output hub 16. A groove 71 is machined in torque pin 49 to accept roll pin 59. Similarly, a groove 73 is machined in the nut 52 to receive roll pin 59. After torque pin 49 is assembled in spacer nut 52 and seated against input hub 15 as shown at 58, a hole 60 is drilled for installing roll pin 59 to positively lock torque pin 49 and Hex spacer nut 52 in place.

The invention has been described in great detail sufficient to enable one of ordinary skill in the art of torque limiting clutches to make and use the same. Obviously, modifications and alterations of the preferred embodiment will occur to others upon a reading and understanding of the specification. It is my intention to include all such modifications and alterations as part of my invention insofar as they come within the scope of the appended claims.

Having thus described my invention, I claim:

1. A torque limiting clutch, comprising:
an input hub;
an output hub;
a pressure plate;
at least two friction surfaces affixed to said output hub, and disposed between said pressure plate and said input hub; and
biasing means for urging said pressure plate against one of said friction surfaces for transmitting mechanical power to said output hub, said biasing means comprising:
a plurality of bolts passing through said pressure plate and said input hub, each bolt having threads from a first end thereof to a first shoulder;
first and second stops spaced apart upon each said bolt for maintaining a precompressed spring therebetween, the length of said bolt between said first stop and said first shoulder being less than the distance between outer surfaces of said pressure plate and input hub;
a nut received by said threads to said first shoulder and in operative contacting engagement with said outer surface of said pressure plate, said spring urging against said outer surface of said input hub;
washers encircling said bolts and disposed on each end of said spring, said bolts having two diameters forming a second shoulder defining said first stop, and a retaining ring disposed near one end of said bolt defining said second stop, whereby said springs are retained in a precompressed position; and
wherein said nut is adapted for drawing said first stop from one of said washers to provide additional predetermined spring compression at torque limiter installation when advancing on said threads.

2. A torque limiting clutch as defined in claim 1 further including washer shaped insulator shims for preadjusting compression to a predetermined force.

3. A torque limiting clutch as defined in claim 1 wherein said springs are helical springs.

4. A torque limiting clutch as defined in claim 3 wherein a cylindrical heat insulator bushing is placed on said bolt within said helical spring.

5. A torque limiting clutch as defined in claim 1 wherein said nut has a flange extending outward on the radius of one end of said nut.

6. A torque limiting clutch as defined in claim 5 wherein the travel of said flanged nut on said bolt is limited by said first shoulder on said bolt thereby causing additional compression of said precompressed helical springs for automatic adjustment to compensate for friction surface wear.

7. A torque limiting clutch as defined in claim 1 which further includes a torque pin interconnecting said input hub and pressure plate, a nut in secured engagement with said torque pin, and a roll pin extending into grooves formed in said nut and torque pin, and through a hole in said input hub for locking said torque pin, input hub and nut in position.

8. A torque limiting clutch as defined in claim 7 wherein said nut extends to a hole formed in a retainer disc, said nut having threads for fastening to said retainer disc with a bolt and thereby retaining said disc.

9. A torque limiting clutch as defined in claim 8 wherein said retainer disc has formed holes for receiving said spring bolts, thereby retaining alignment and allowing axial movement of said spring bolts.

10. A torque limiting clutch as defined in claim 1 wherein said friction surfaces are disc shaped friction pucks.

11. A torque limiting clutch as defined in claim 10 wherein said friction pucks have an annular groove and positioning in said groove is a wear bushing for preventing wear of said friction pucks on their periphery.

12. A torque limiting clutch as defined in claim 1 wherein said friction surfaces are annular friction discs.

* * * * *